United States Patent
Huet et al.

(10) Patent No.: US 8,364,150 B2
(45) Date of Patent: Jan. 29, 2013

(54) METHOD FOR SELECTING BASE STATION FOR HANDOVER FROM PLURALITY OF TARGET BASE STATIONS AND DEVICE THEREOF

(75) Inventors: Francois Huet, Limours (FR); Lily H. Zhu, Morris, NJ (US)

(73) Assignee: Alcatel Lucent, Paris (FR)

( * ) Notice: Subject to any disclaimer, the term of this patent is extended or adjusted under 35 U.S.C. 154(b) by 273 days.

(21) Appl. No.: 12/654,867

(22) Filed: Jan. 7, 2010

(65) Prior Publication Data
US 2011/0164593 A1 Jul. 7, 2011

(51) Int. Cl.
*H04W 36/00* (2009.01)

(52) U.S. Cl. ........ 455/439; 455/436; 455/442; 455/453; 455/522; 455/422.1; 370/331

(58) Field of Classification Search .................. 455/439, 455/436, 442, 453, 522, 422.1; 370/331
See application file for complete search history.

(56) References Cited

U.S. PATENT DOCUMENTS 7,173,918 B2 * 2/2007 Awater et al. ................. 370/332
8,023,465 B2 * 9/2011 Prehofer ....................... 370/331

* cited by examiner

*Primary Examiner* — Nghi H Ly
(74) *Attorney, Agent, or Firm* — Harness, Dickey & Pierce, P.L.C.

(57) ABSTRACT

The method for selecting a base station for handover from a plurality of target base stations includes receiving, at a network element, measurement reports and loads of the plurality of target base stations, where the plurality of target base stations are within a coverage area of a mobile station. The method further includes selecting, at the network element, the base station from the plurality of target base stations for handover of the mobile station of a source base station to the selected target base station based on the measurement reports and the loads of the plurality of target base stations.

17 Claims, 3 Drawing Sheets

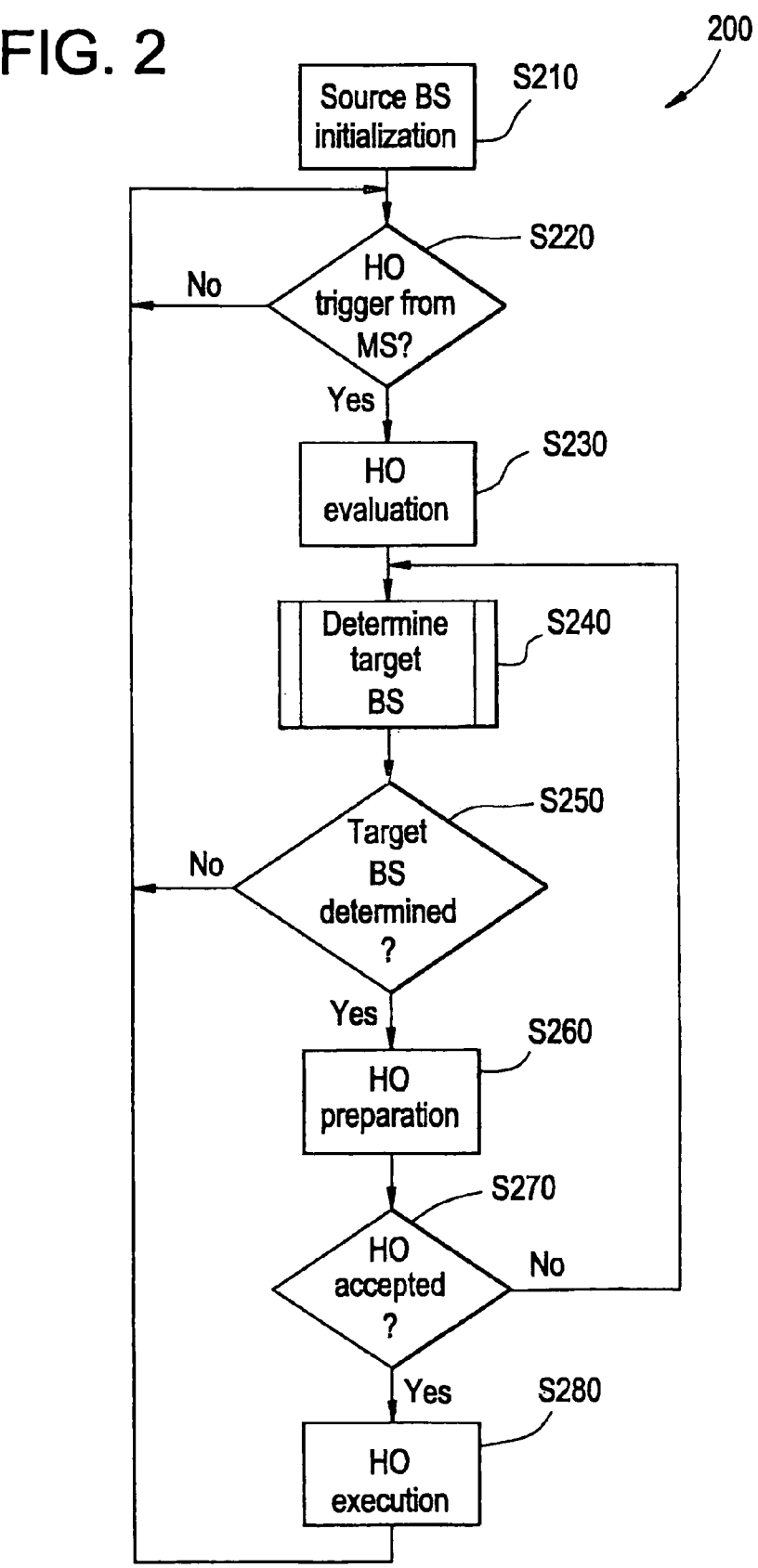

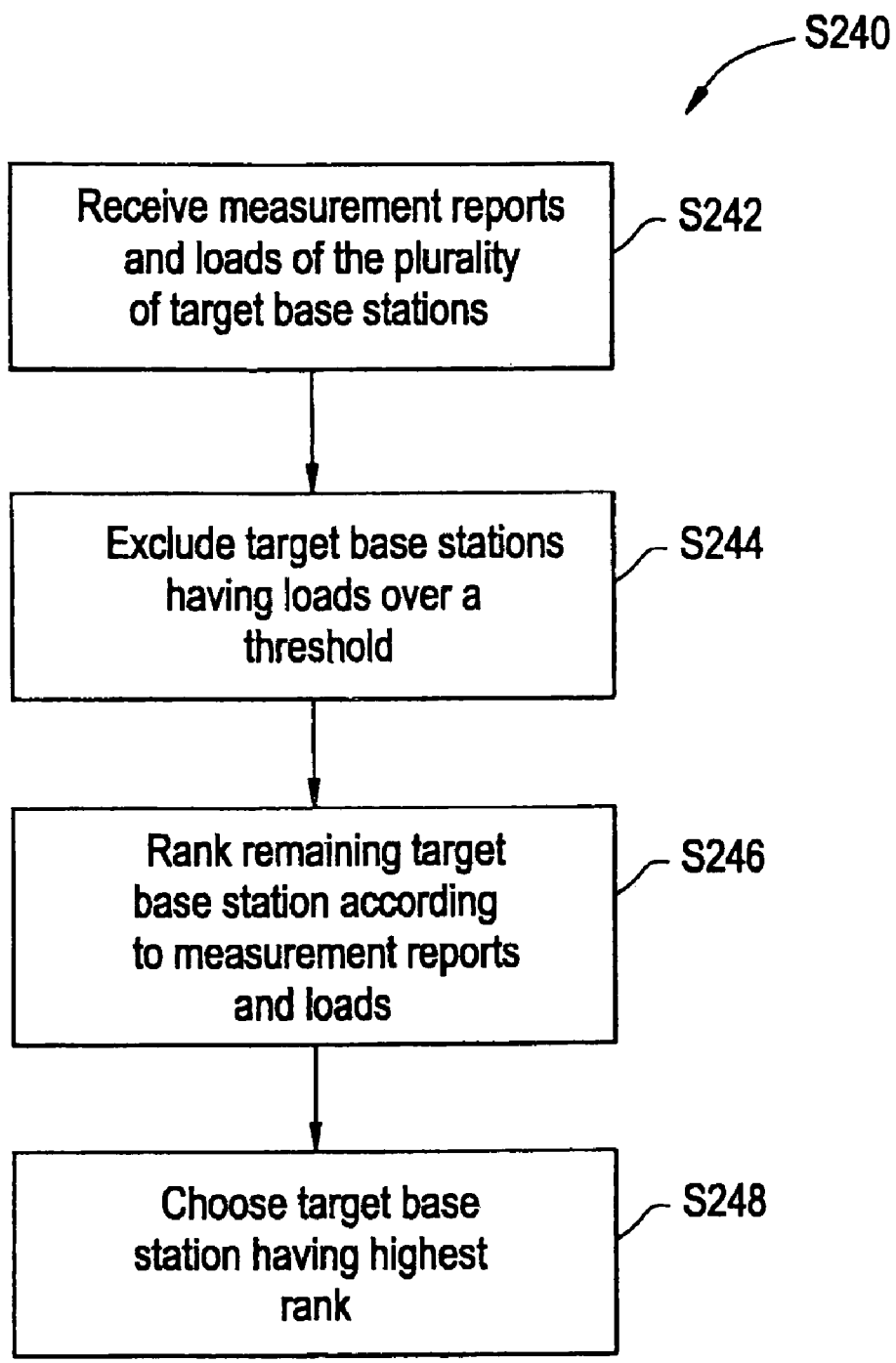

METHOD FOR SELECTING BASE STATION FOR HANDOVER FROM PLURALITY OF TARGET BASE STATIONS AND DEVICE THEREOF

BACKGROUND

1. Field

One or more example embodiments relate to selecting a base station for handover, for example, a network element or method for selecting a base station for handover from a plurality of target base stations.

2. Description of the Related Art

A rate of successful handovers in a wireless communication system is used as a benchmark for measuring performance of the wireless communication system. This is because an unsuccessful handover leads to communication degradation for the user due to data loss or gaps or even connection loss. For real-time service such as voice and video telephony, the degradation translates to garbled voice, voice gap and dropped calls. With the introduction of wideband wireless technology, wireless data networks are gradually replacing the traditional wireless circuit network due to their relatively low cost, high bandwidth and rich multi-media services.

There are many mobile station initiated handover methods that signal the source base station, which serves the signaling mobile station, to select a target base station for handover. One such method sets up multiple target base stations simultaneously over the Radio Access Network (RAN) backbone and performs multi-casting from a data anchor to these target base stations. The purpose of this method is to achieve a relatively fast handover by avoiding sequential handover admission control on a plurality of target base stations, which occurs when the first target evaluated target base station lacks resources to serve the incoming handover and therefore one or more subsequent target base stations must be sequentially evaluated.

However, setting up and multi-casting multiple target base stations simultaneously increases the complexity of resource reservation and de-allocation and therefore the potential for handover failure. In addition, the resources, both at the multiple target base stations and over the backhaul of the RAN, are wasted by this method.

Nonetheless, setting up multiple target base stations sequentially may lead to longer handover times and/or handover failure if one or more of the sequentially setup target base stations refuses the handover.

Code division multiple access (CDMA) technology, which provides an example of setting up the multiple target base stations simultaneously, uses multiple legs, which include one or more downlink (or forward) channels for transmitting information from the base station to the mobile station and one or more uplink (or reverse) channels for transmitting information from the mobile station to the base station. 3.5G and 4G wireless technology, which is an example of setting up the multiple target base stations sequentially, uses an Orthogonal Frequency-Division Multiple Access (OFDMA) air interface technology that adopts a single serving leg, which only uses one communication link to/from the mobile station.

The single leg support makes handover evaluation even more important because a handover trigger must be accurate and allow enough handover preparation time while the communication link is still healthy since the communication link will not have the benefit of multiple leg support. Further, handover resource management must be relatively fast and robust enough to ensure the base station targeted for handover can accept the incoming handover in time.

SUMMARY

According to an example embodiment, a method for selecting a base station for handover from a plurality of target base stations includes receiving, at a network element, measurement reports and loads of the plurality of target base stations, where the plurality of target base stations are within a coverage area of a mobile station. The method further includes selecting, at the network element, the base station from the plurality of target base stations for handover of the mobile station of a source base station to the selected target base station based on the measurement reports and the loads of the plurality of target base stations.

In an example embodiment, the receiving receives the measurement reports from the mobile station and the measurement reports include at least a signal-to-noise ratio (SNR) of the plurality of target base stations.

The selecting selects the target base station based on the loads and the signal-to-noise (SNR) ratio of the plurality of target base stations.

In an example embodiment, the selecting further includes excluding base stations from the plurality of target base stations having a load above a threshold indicating that the excluded base station is at least one of near or at full loading.

In an example embodiment, the selecting selects the base station having the lowest load from the plurality of target base stations having a SNR above a SNR threshold.

In an example embodiment, the method further includes sending a request to the selected target base station from the network element for handover of the mobile station of the source base station to the selected target base station.

In an example embodiment, the method further includes repeating the selecting for a remaining plurality of the target base stations if the request is denied by the selected target base station.

In an example embodiment, the method further includes handing over the mobile station to the selected target base station if the request is accepted by the selected target base station.

In an example embodiment, the selecting selects the base station having the highest SNR from the plurality of target base stations having a load above a load threshold.

In an example embodiment, the selecting ranks the plurality of target base stations according to a product of the SNR ratio and the load of the plurality of target base stations.

In an example embodiment, the selecting further includes modifying the SNR ratios of the plurality of target base stations using weights in proportion to the corresponding loads of the plurality of target base stations, and choosing the target base station having the lowest modified SNR ratio.

In an example embodiment, the method further includes receiving a trigger, at the network element, from the mobile station to initiate handover before the receiving the measurement reports and loads of the plurality of target base stations.

In an example embodiment, the source base station includes the network element.

According to an example embodiment, a network element for selecting a base station for handover from a plurality of target base stations includes a receiver and a selector. The receiver is configured to receive measurement reports and loads of the plurality of target base stations, where the plurality of target base stations are within a coverage area of a mobile station. The selector is configured to select the base station from the plurality of target base stations for handover of the mobile station of a source base station to the selected target base station based on the measurement reports and the loads of the plurality of target base stations.

BRIEF DESCRIPTION

Example embodiments will become more fully understood from the detailed description given herein below and the accompanying drawings, wherein like elements are represented by like reference numerals, which are given by way of illustration only and thus are not limiting of the present invention, and wherein:

FIG. 2 illustrates a method for selecting a target base station according to an embodiment of the present invention; and FIG. 3 illustrates an embodiment of step S240 in the method of FIG. 2.

DETAILED DESCRIPTION

Figure 1:
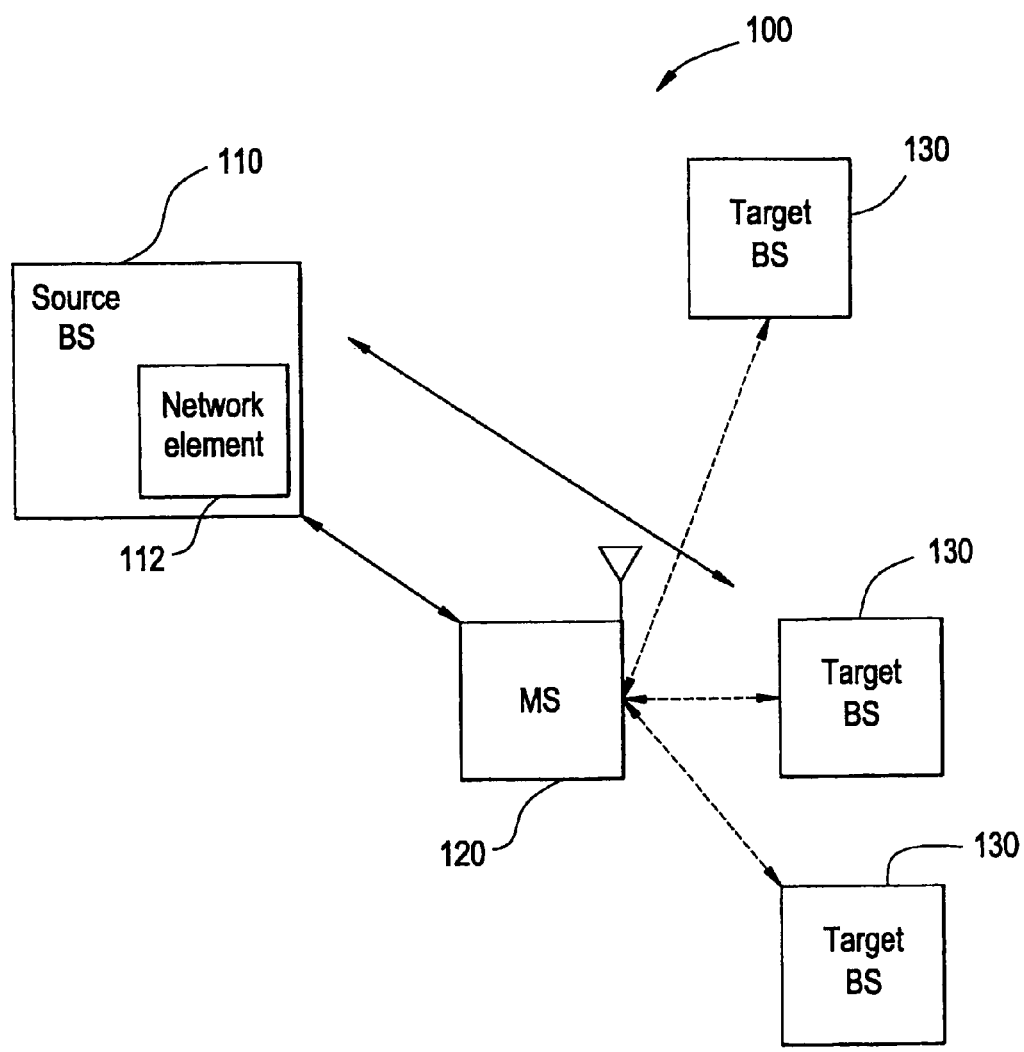
FIG. 1 illustrates a wireless communication system according to an embodiment of the present invention.

Various embodiments of the present invention will now be described more fully with reference to the accompanying drawings in which some embodiments of the invention are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station (BS), Node B, etc. and may describe equipment that provides data and/or voice connectivity between a network and one or more users.

As is well-known in the art, each of a mobile and a base station may have transmission and reception capabilities.

Transmission from the base station to the mobile is referred to as downlink or forward link communication. Transmission from the mobile to the base station is referred to as uplink or reverse link communication.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 illustrates a wireless communication system 100 according to an embodiment of the present invention. In FIG. 1, the wireless communication system 100 includes a source base station 110, a mobile station 120 and a plurality of target base stations 130. The source base station 110 is further shown to include a network element 112. However, in an alternative embodiment, the network element 112 may instead be external to the source base station 110. Further, the target base stations 130 may also include a network element (not shown).

The source and target base stations 110 and 130 are configured to provide wireless connectivity to one or more mobile stations 120. Further, the source and target base stations 110 and 130 are configured to communicate with each other. For example, the source and target base stations 110 and 130 are configured to exchange information regarding their respective loading such as loading updates, configuration changes, and handover messages for incoming handover evaluation. However, the wireless communication system 100 is not limited to base stations 110 and 130 in order to provide wireless connectivity. For example, the wireless communication system 100 may use or include other devices to provide wireless connectivity, such as base transceiver stations, base station routers, WiMAX or WiFi access points, access networks, and the like.

The mobile station 120 may include but is not limited to user equipment (EU), a fixed or mobile subscriber unit, a pager, a cellular telephone, a personal digital assistant (PDA), a computer, or any other type of user device capable of operating in a wireless environment. While the wireless communication system 100 is only shown to handover a single mobile station 120 for the sake of simplicity, it will be understand that embodiments of the present invention may handover a plurality of mobile stations 120 simultaneously from a single source base station 110. Further, while only a single source base station 110 is shown, embodiments of the present invention may include a plurality of source base stations 110 in the wireless communication system 100.

The network element 112 of the source base station 110 includes a receiver (not shown) and a selector (not shown). The receiver is configured to receive measurement reports and loads of the plurality of target base stations 130, where the plurality of target base stations 130 are within a coverage area of the mobile station 120. The selector is configured to select a base station from the plurality of target base stations 130 for handover of the mobile station 120 from the source base station 110 to the selected target base station 130 based on the measurement reports and the loads of the plurality of target base stations 130. The measurement reports may be received from the mobile station 120 and include at least a signal-to-noise ratio (SNR) of the plurality of target base stations 130. The loads may be received from the plurality of target base stations 130 and be based on, for example, a number of mobile stations being served by a target base stations 130, an available bandwidth of the target base station 130, etc. The selection of the base station from the plurality of target base station 130 by the network element 112 will be explained in greater detail with respect to FIGS. 2 and 3 below.

One or more of the source base stations 110, the target base stations 130, and the receiver and selector of the network element 112 include a processor (not shown) and a memory (not shown), which may store data and/or programs for use with the processor in order to process data or control information related to the mobile station 120, the source base station 110 and/or the target base stations 130. The memory may, for example, include any type of computer storage mediums such as Read Only Memory (ROM) and/or Read Access Memory (RAM).

FIG. 2 illustrates a method for selecting a target base station according to an embodiment of the present invention. Further, it will be understood that functions described below with respect to the source base station 110 are interchangeable and/or combinable with the network element 112. Referring to FIGS. 1 and 2, at S210, the source base station 110 initializes a wireless connection with the mobile station 120 according to communication protocols known in the art. Subsequently, at S220, the source base station 110 determines whether the mobile station 120 has sent a trigger to the source base station 110 to initiate a handover. If the source base station 120 receives this trigger, the source base station 120 begins a handover evaluation at S230, which involves at least determining the plurality of target base stations 130 that are within a coverage area of the mobile station 120 for handover according to communication protocols known in the art. Next, at S240, the source base station 120 selects a base station from the plurality of target base stations 130 for handover of the mobile station 120 based on the measurement reports and the loads of the plurality of base stations. The selecting of the base station from the plurality of target base stations 130 will be described in more detail with respect to FIG. 3 below.

At S250, the source base station 110 determines whether a base station from the plurality of target base stations 130 has been selected. If the source base station 110 determines that none of the target base stations 130 can accept the mobile station 120 for handover, the source base station 110 returns to S220. If the source base station 110 does select a base station from the plurality of target base stations 130 for handover, then the source base station 110 prepares to handover the mobile station 120 at S260 according to communication protocols known in the art. Next, at S270, the source base station 110 sends a request to the selected target base station 130 for handover of the mobile station 120. If the selected target base station 130 accepts the source base station's request, then the handover of the mobile station 120 from the source base station 110 to the selected target base station 130 is executed at S280 according to communication protocols known in the art. Otherwise, if the selected target base station 130 denies the source base station's request, the source base station returns to S240 to repeat the selecting of a base station from the remaining plurality of the target base stations 130 where the denying target base station is excluded.

FIG. 3 illustrates an embodiment of step S240 in the method of FIG. 2. At S242, the source base station 110 receives the measurement reports from the mobile station 120 and the loads from the plurality of target base stations 130. Next, at S244, the source base station 110 excludes any of the target base stations from the plurality of target base stations that has a load above a load threshold. The load threshold may be determined empirically or based on specifications for the plurality of target base stations 130. For example, the load threshold may be set such that target base stations 130 at least one of near or at full loading are excluded by the source base station 110. Alternatively, the load threshold may be set such that target base stations 130 having a loading above a certain percentage (e.g. 75%) are excluded by the source base station 110.

Then, at S246, the source base station 110 ranks the remaining plurality of target base stations 130 according the measurement reports and the loads. As noted above, the measurement reports include at least a signal-to-noise ratio (SNR) of the plurality of target base stations 130. For example, the source base station 110 may rank the plurality of target base stations 130 according to a product of the SNR ratio and the load of the plurality of target base stations 130. In addition, the source base station 110 may also modify the SNR ratios of the plurality of target base stations using weights in proportion to the corresponding loads of the plurality of target base stations.

Subsequently, at S248, the source base station 110 chooses the target base station 130 having the highest or lowest rank depending on whether the remaining target base stations 130 are ranked in ascending or descending order of preference. For instance, according to the above example, the source base station 110 may choose the target base station having the highest modified SNR ratio.

While FIG. 3 only illustrates one embodiment of step S240 in the method of FIG. 2, embodiments are not limited thereto. For example, in another embodiment, the source base station 110 may select the base station having the lowest load from the plurality of target base stations 130 having a SNR above a SNR threshold. The SNR threshold may be determined empirically or based on specifications related to the plurality of target base stations 130.

In yet another embodiment, the source base station 110 may select the base station having the highest SNR from the plurality of target base stations 130 having a load below a load threshold. The SNR threshold may be determined empirically or based on specifications related to the plurality of target base stations 130.

Thus, embodiments of the present invention allow for selection of a base station to receive a handoff based on both measurement reports from the mobile station 120 and loads from a plurality of target base stations 130. In addition, taking into account the loads of the target base stations 130 when selecting a target base station on a sequential basis, reduces the likelihood of the selected target base station rejecting the handover request. As a result, overhead and time for the handover are reduced as well as a likelihood for the handover failing.

Variations of the embodiments of the present invention are not to be regarded as a departure from the spirit and scope of the embodiments of the invention, and all such variations as would be apparent to one skilled in the art are intended to be included within the scope of this invention.

What is claimed is:

1. A method for selecting a base station for handover from a plurality of target base stations, comprising:
   receiving, at a network element, measurement reports and loads of the plurality of target base stations from a mobile station, where the plurality of target base stations are within a coverage area of the mobile station, the measurement reports including at least a signal-to-noise ratio (SNR) of the plurality of target base stations; and
   selecting, at the network element, the base station from the plurality of target base stations for handover of the mobile station of a source base station to the selected target base station based on the measurement reports and the signal-to-noise (SNR) ratio and the loads of the plurality of target base stations, excluding base stations from the plurality of target base stations having a load above a threshold indicating that the excluded base station is at least one of near or at full loading.

2. The method of claim 1, wherein the selecting,
   selects the base station having the lowest load from the plurality of target base stations having a SNR above a SNR threshold.

3. The method of claim 2, further comprising:
   sending a request to the selected target base station from the network element for handover of the mobile station of the source base station to the selected target base station.

4. The method of claim 3, further comprising:
   repeating the selecting for a remaining plurality of the target base stations if the request is denied by the selected target base station.

5. The method of claim 3, further comprising:
   handing over the mobile station to the selected target base station if the request is accepted by the selected target base station.

6. The method of claim 1, wherein the selecting,
   selects the base station having the highest SNR from the plurality of target base stations having a load above a load threshold.

7. The method of claim 6, further comprising:
   sending a request to the selected target base station from the network element for handover of the mobile station of the source base station to the selected target base station.

8. The method of claim 6, further comprising:
   repeating the selecting for a remaining plurality of the target base stations if the request is denied by the selected target base station.

9. The method of claim 6, further comprising:
   handing over the mobile station to the selected target base station if the request is accepted by the selected target base station.

10. The method of claim 1, wherein the selecting ranks the plurality of target base stations according to a product of the SNR ratio and the load of the plurality of target base stations.

11. The method of claim 10, wherein the selecting further includes,
    modifying the SNR ratios of the plurality of target base stations using weights in proportion to the corresponding loads of the plurality of target base stations, and
    choosing the target base station having the lowest modified SNR ratio.

12. The method of claim 11, further comprising:
    sending a request to the selected target base station from the network element for handover of the mobile station of the source base station to the selected target base station.

13. The method of claim 12, further comprising:
repeating the selecting for a remaining plurality of the target base stations if the request is denied by the selected target base station.

14. The method of claim 12, further comprising:
handing over the mobile station to the selected target base station if the request is accepted by the selected target base station.

15. The method of claim 1, further comprising:
receiving a trigger, at the network element, from the mobile station to initiate handover before the receiving the measurement reports and loads of the plurality of target base stations.

16. The method of claim 1, wherein the source base station includes the network element.

17. A network element for selecting a base station for handover from a plurality of target base stations, comprising:

a receiver configured to receive measurement reports and loads of the plurality of target base stations from a mobile station, where the plurality of target base stations are within a coverage area of the mobile station, the measurement reports including at least a signal-to-noise ratio (SNR) of the plurality of target base stations; and a selector configured to select the base station from the plurality of target base stations for handover of the mobile station of a source base station to the selected target base station based on the measurement reports and the signal-to-noise (SNR) ratio and the loads of the plurality of target base stations, excluding base stations from the plurality of target base stations having a load above a threshold indicating that the excluded base station is at least one of near or at full loading.

* * * * *